Figure 1:
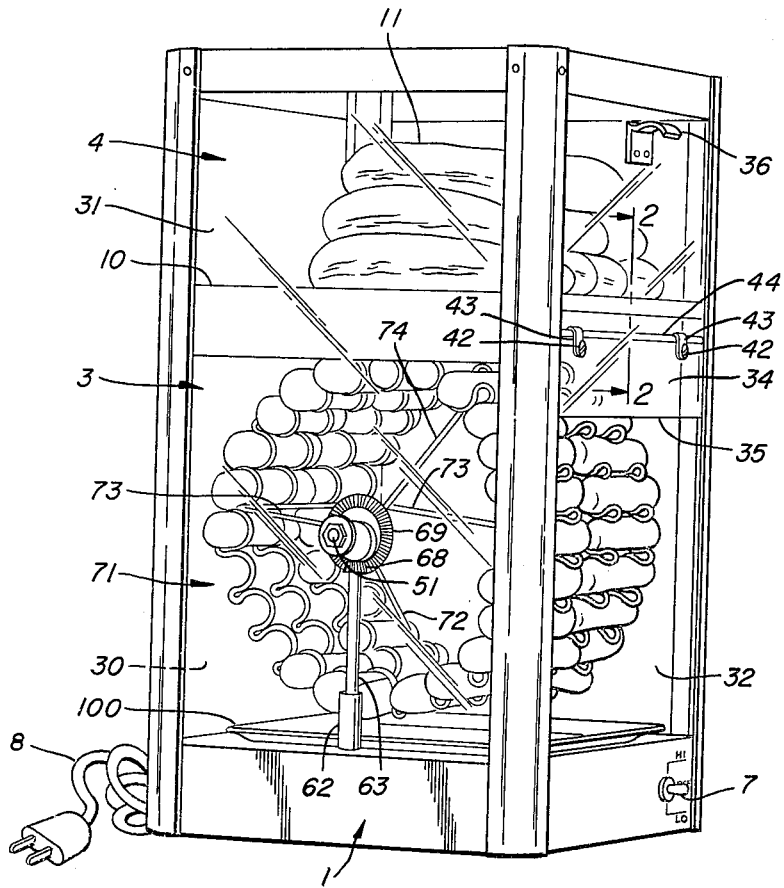

May 21, 1963  J. P. RODMAN  3,090,294
SAUSAGE COOKER

Filed Dec. 19, 1958  2 Sheets-Sheet 1

INVENTOR.
JAMES P. RODMAN
BY
ATTORNEY

May 21, 1963  J. P. RODMAN  3,090,294
SAUSAGE COOKER

Filed Dec. 19, 1958  2 Sheets-Sheet 2

INVENTOR.
JAMES P. RODMAN
BY
ATTORNEY

United States Patent Office 3,090,294
Patented May 21, 1963

3,090,294
SAUSAGE COOKER
James P. Rodman, 1125 Fernwood Blvd., Alliance, Ohio
Filed Dec. 19, 1958, Ser. No. 781,785
2 Claims. (Cl. 99—427)

This invention relates to a cooker for frankfurters or other sausages. More particularly it relates to a cooker for cooking sausages by infrared radiation, although a different heat source may be used. In the preferred form of the cooker, the sausages are held near their ends at the circumference of a drum which is rotated before the source of heat, and the drum includes new means for holding the individual sausages.

Preferably, the drum is composed essentially of one or more pairs of wire hoops, each of which is bent to provide many receptors. Alternatively, the hoops may be replaced by stampings or the like. Each receptor is designed to embrace one end of a sausage. There are the same number of receptors in each hoop (or the like) and they are in line with one another; and the two hoops of each pair are spaced somewhat less than the length of a sausage so as to support each near its ends.

As the drum is rotated, the sausages pass before the source of heat, which is preferably one or more infrared lamps, not necessarily of equal wattage, which cook the sausages to an appetizing degree, and when the cooking heat is shut off, the cooked sausages are kept warm by heating them in any suitable manner. If infrared lamps are used for cooking, part of these lamps may be used for warming, or they may all be used at a lower voltage. The drum is rotates slowly, usually at about 1 r.p.m. but this may vary, and for frankfurters about ¾ inch in diameter, the required cooking time is about 8 to 20 minutes. The drum may be formed with receptors of other sizes to hold sausages of other diameters, and the two receptors of a pair may be spaced any distance from one another to support sausages of any given length.

The cooking heat is preferably supplied from one or more infrared radiating sources each having a slim elongated configuration, and each provided with an essentially parabolic or hyperbolic reflector, with the center of the heat source at or near its focus. The one or more such heat sources and reflectors are preferably located above the drum with the axis of the one or more reflectors horizontal, although this is not necessary. If more than one heat source and reflector are used, they are preferably all located near one another. They are preferably located under the shelf which holds buns being warmed to be used for making sandwiches of the frankfurters. The cabinet is glass walled. This is illustrative, and the invention is not limited to such a design. In the drawings—

Figure 2:
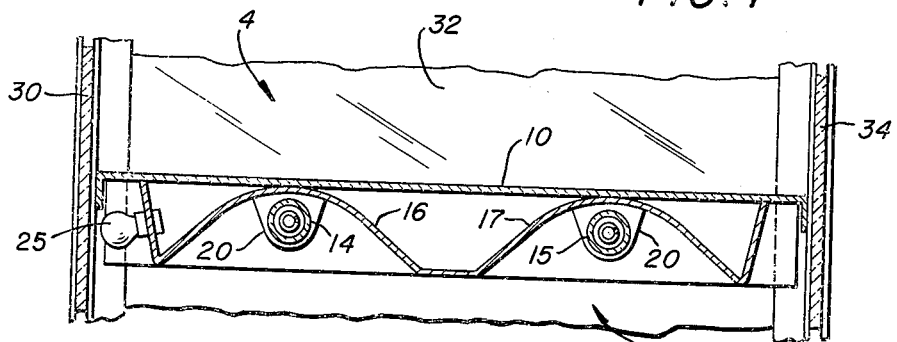
Figure 4:
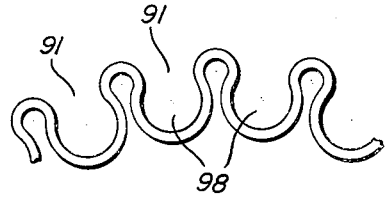
Figure 3:
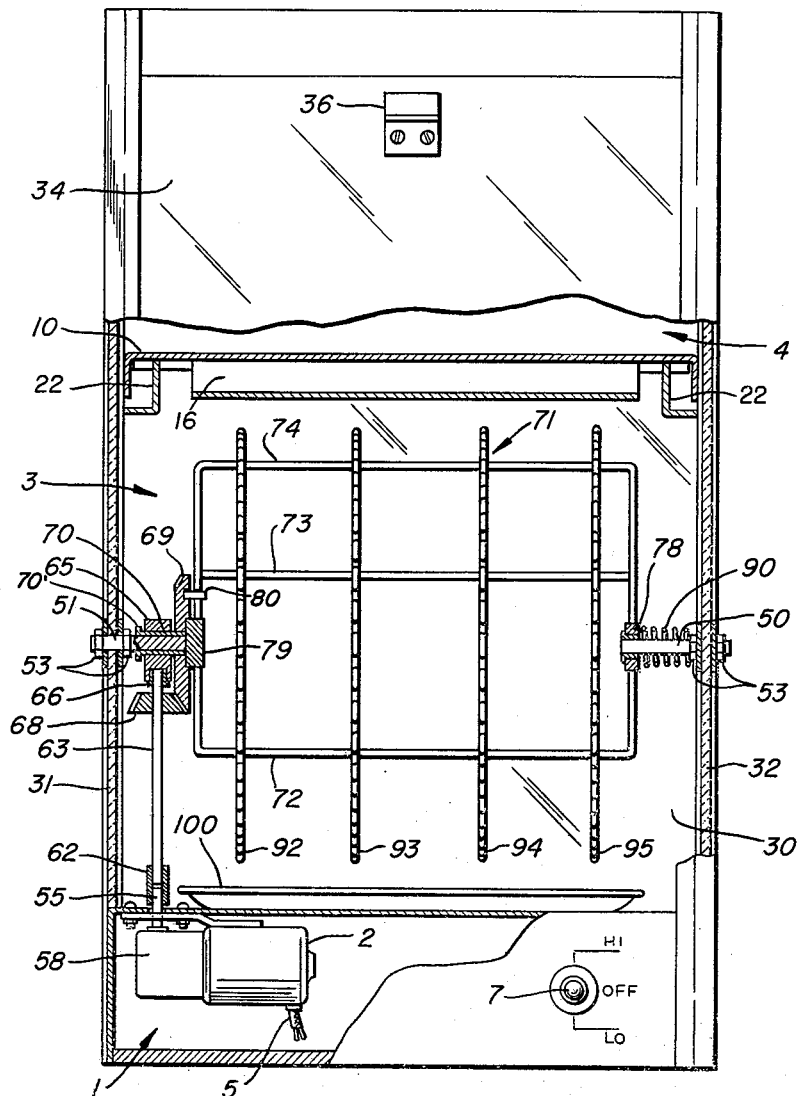
Figure 5:
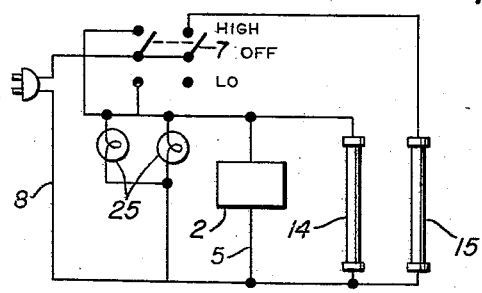

FIG. 1 is a view in perspective of the cabinet;
FIG. 2 is an enlarged section of the cabinet, through the lamps, on the line 2—2 of FIG. 1 (the sausages shown in FIG. 1 being omitted);
FIG. 3 is a front elevation of the cabinet, partly broken away to show how the drum is supported and rotated;
FIG. 4 is a detail showing sausage-holding loops in a wire hoop of the drum; and
FIG. 5 is a wiring diagram.

The cabinet comprises the compartment 1 in which the motor 2 is located, the cooking compartment 3 and the warming oven 4. The internal wires 5 connect the motor to a source of current, and the electrical equipment is operated by the switch 7. Power is supplied to the cooker by line cord 8.

The shelf 10 supports the buns 11. The two infrared lamps 14 and 15 for cooking the frankfurters, are supported in reflectors 16 and 17 which are fastened to the bottom of the shelf 10. The lamps may be of the type commonly called quartz infra-tubes. The reflectors may be of polished aluminum or other suitable metal, such as gold-plated steel, etc. The lamps are snapped in sockets 20 located in the opposite ends of the respective reflectors, or may be mounted directly in suitable slots cut in channels 22.

To the rear of the reflector 16 and fastened to the channels 22 are two or more illuminating light bulbs 25 which illuminate the cabinet and any printing or advertising matter on the several panes.

Three sides of the cabinet are enclosed by the rear glass pane 30 and the side glass panes 31 and 32. The glass pane 34, which extends only to the line 35, covers only the top portion of the front of the cabinet, the balance being left open. The handle 36 is fastened to this. Bolts 42 pass through holes in the pane 34 and also through holes in the hangers 43, the upper ends of which are rotatably engaged with the rod 44 which is held in the corners of the cabinet. To gain access to the buns 11, the operator grasps the handle 36 and swings it down, outwardly causing the pane to pivot about rod 44. Stops (not shown) in the sides of the cabinet prevent the front pane from swinging down beyond a horizontal position.

The drum is supported by the trunnions 50 and 51, which pass through holes in the panes 32 and 31, respectively, and are held fixed in a horizontal position by nuts 53 threaded on the trunnions.

The motor drive shaft 55 rises from the gear box 58, and is coupled by the sleeve 62 to gear drive shaft 63. The block 65 supported on trunnion 51 is recessed at the bottom and at 66 forms a bearing for the top of shaft 63. The beveled gear 68 is fastened to the shaft and the beveled gear 69 is fastened to sleeve 70 which turns inside block 65. The flange 70' on the sleeve 70 insures constant meshing of the two gears.

The drum 71 is formed of three wire frames 72, 73 and 74 (as shown) positioned at an angle of 120 degrees to one another. Their ends are held in the collar 78 and block 79. The beveled gear 69 is recessed to receive block 79.

Coil spring 90 encircles the trunnion 50. It is advantageously fastened to the inside nut 53, but this is not necessary.

To assemble the cooker, the collar 78 at one end of the drum is slipped over the trunnion 50 against the pressure of spring 90. Then block 79 is slipped into the recess in beveled gear 69 and over the inner end of trunnion 51, and the spring holds it there. Driving pins 80 attached to gear 69 engage wire frames 72, 73, and 74, causing the cage assembly to rotate with gear 69.

Two pairs of bent wire hoops 92 and 93, and 94 and 95 are welded to frames 72, 73, and 74, parallel to one another. The frames form a skeletal frame support for the hoops. These are formed from stiff wire which is sufficiently flexible to permit bending to form the outwardly facing receptors 98. There are the same number of receptors in each pair of hoops, and they are in line with one another to hold the ends of the same frankfurter. The inside diameter of each receptor is just about the same as the diameter of a frankfurter, viz. about ¾ inch. The depth of each receptor is greater than the radius of a frankfurter, and the mouth 91 of each receptor is somewhat less than the diameter of a frankfurter, e.g. ⅝ inch.

The frankfurters are easily placed upon, and removed from the drum. The ends of each frankfurter are squeezed through the mouths of opposite receptors. Once they have been pressed beyond the mouths they may be held loosely within the receptors. The receptors may be somewhat larger or smaller in diameter than the diameter of a frankfurter, but generally it is desirable to have them of such a size that they hold the frankfurters comfortably without squeezing.

FIG. 5 is a preferred wiring diagram, but it is purely illustrative. When the frankfurters or other sausages are engaged in the receptors on the drum, the switch 7 is turned to "HI" and both infra-red cooking tubes are activated, the illuminating bulbs 25 are lighted for illumination, and the motor 2 is started. The frankfurters or other sausages are broiled as the drum is slowly rotated under the cooking lamps.

Although only the top sides of the sausages come close to the lamps when they are at the top of the drum, the cooking rays penetrate, and the sausages are heated substantially uniformly throughout. The sausages can be placed on, and removed from the drum without stopping its rotation. The pan 100 collects grease and other drippings.

When the cooking is completed, the switch 7 is turned to "LO." As shown in the illustrative wiring diagram, this removes cooking heat from the unit by removing power from infra-tube 15. The wattage of infra-tube 14 is chosen to provide a proper warming heat to the cooked sausages. The lights and motor remain "ON," insuring uniform warming and attractive, illuminated display of the cooked sausages.

The description and drawings are illustrative. The invention is covered in the claims which follow.

What I claim is:

1. A sausage cooker which includes a drum-shaped sausage holder for sausages while being cooked, means for rotating the holder about its axis and heating means outside of the holder; each end of the holder being generally cylindrical and formed of a wire circuitously bent to form a plurality of the same number of generally circular receptors each the same distance from the axis of the holder, each receptor having a mouth facing radially outward; each receptor constituting less than a full circle but greater than half a circle of the bent wire whereby the width of the mouth is less than the diameter of the receptor, the wire extending from the mouth of each receptor to the mouth of the adjoining receptors on the two sides thereof, the wire being relatively stiff and unyielding whereby a pair of receptors of which one is in each end of the holder is adapted to receive a sausage and retain the same when the mouths of the receptors face downwardly, a sausage being introduceable into and removable from such a pair of receptors through their mouths by moving the sausage radially through the mouths with sufficient force to squeeze it therethrough.

2. A sausage cooker which includes a sausage holder with means for rotating the same about its axis, and heating means located externally of the holder, the holder being formed of two generally circular ends spaced from one another and attached externally of a skeletal frame support on said axis, both ends of the holder being in one piece and having in their respective circumferences a plurality of the same number of outwardly facing receptors, each receptor having a mouth somewhat narrower than the portion located inwardly thereof which mouth is relatively unyielding whereby a pair of receptors of which one is in each end of the holder is adapted to receive a sausage and retain the same when the mouths of the receptors face downwardly, a sausage being introduceable into and removable from such a pair of receptors through their mouths by moving the sausage radially through the mouths with sufficient force to squeeze it therethrough.

References Cited in the file of this patent

UNITED STATES PATENTS

| | | |
|---|---|---|
| 456,175 | Van Orman | July 21, 1891 |
| 1,393,368 | Henry | Oct. 11, 1921 |
| 1,479,819 | Kluever | June 8, 1924 |
| 1,610,050 | Hicks | Dec. 7, 1926 |
| 1,832,854 | Blier | Nov. 24, 1931 |
| 1,870,476 | Babcock | Aug. 9, 1932 |
| 1,952,433 | Halstead | Mar. 27, 1934 |
| 2,310,349 | Bobo | Feb. 9, 1943 |
| 2,455,034 | Zoegall | Nov. 30, 1948 |
| 2,478,809 | Deal | Aug. 9, 1949 |
| 2,566,524 | Kammins | Sept. 4, 1951 |
| 2,579,827 | Johnson | Dec. 25, 1951 |